(No Model.)  2 Sheets—Sheet 1.
T. KEITH.
FREIGHT ELEVATOR AND CONVEYER.
No. 254,661.  Patented Mar. 7, 1882.
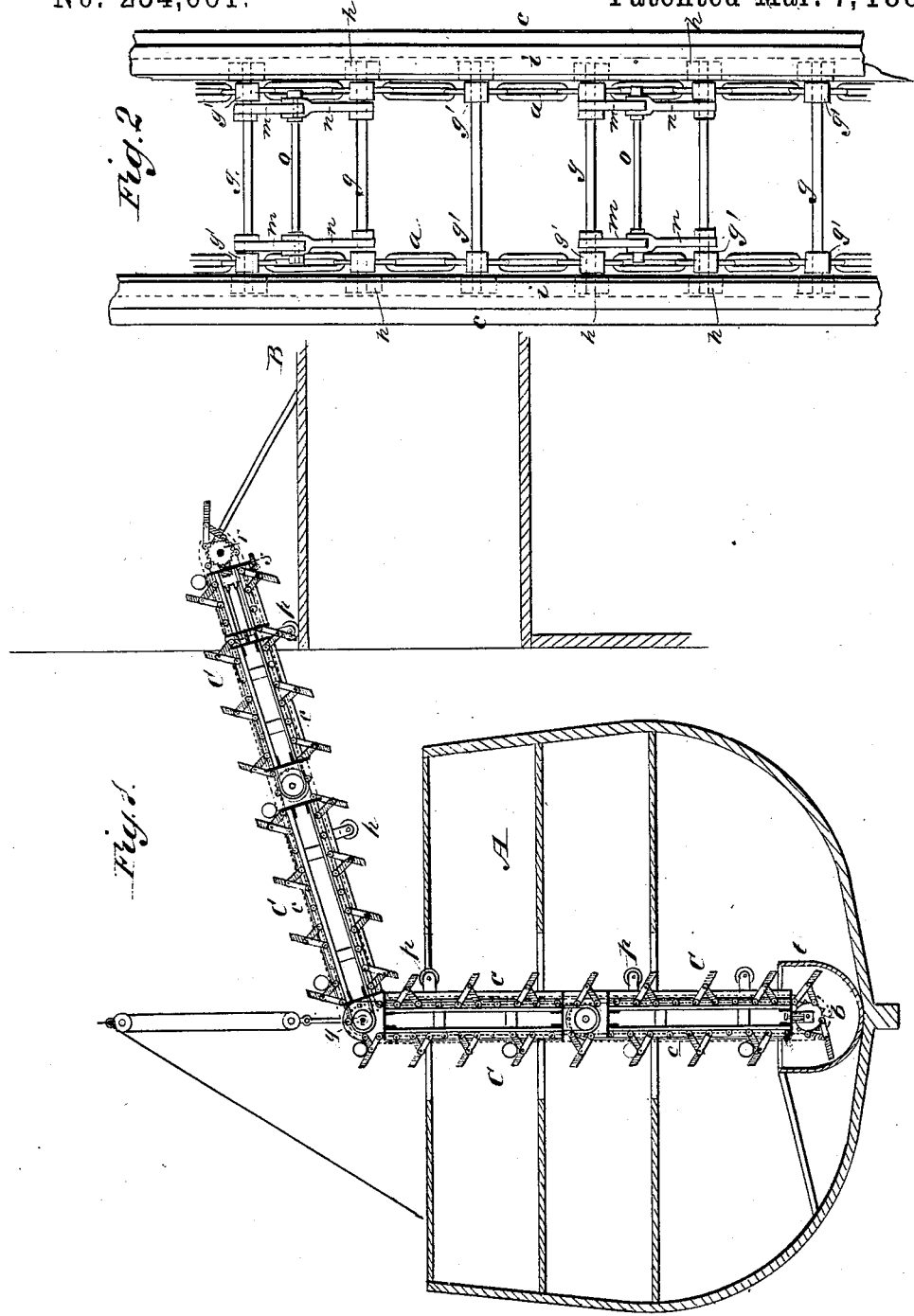
WITNESSES:
Francis McArdle.
C. Sedgwick
INVENTOR:
T. Keith
BY Munn & Co
ATTORNEYS.

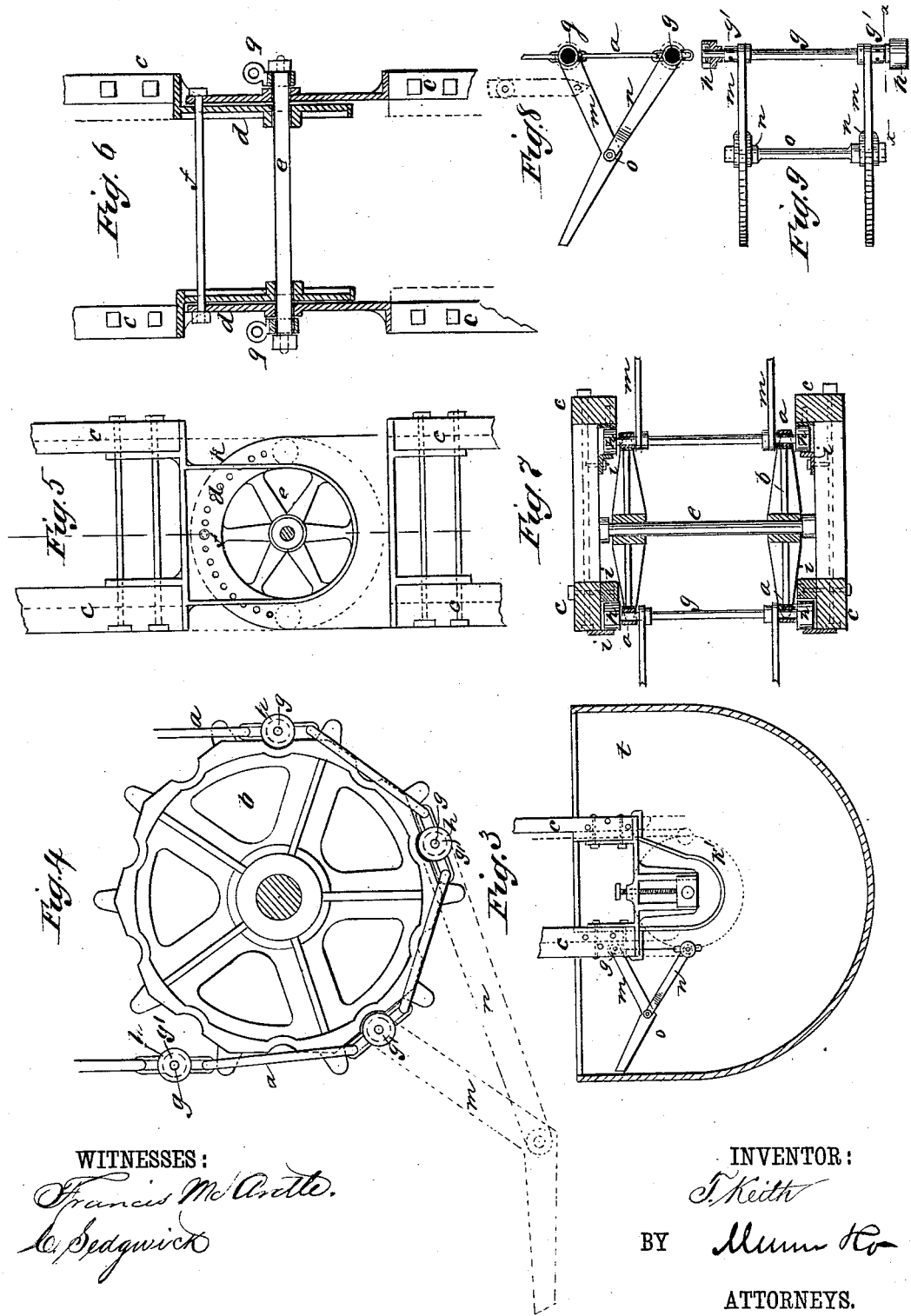

UNITED STATES PATENT OFFICE.

THOMAS KEITH, OF NEW YORK, ASSIGNOR TO CHARLES B. MESEROLE, OF NEW ROCHELLE, N. Y.

FREIGHT ELEVATOR AND CONVEYER.

SPECIFICATION forming part of Letters Patent No. 254,661, dated March 7, 1882.

Application filed November 15, 1881. (No model.)

*To all whom it may concern:*

Be it known that I, THOMAS KEITH, of the city, county, and State of New York, have invented an Improved Freight Elevator and Conveyer, of which the following is a full, clear, and exact description.

My improvements relate to endless-chain elevators for elevating or lowering and delivering freight on docks and vessels.

The object of the invention is to provide for transfer of freight from a vessel to a dock or the reverse by arrangements that shall be practically automatic in their action; and it consists in a jointed frame apparatus that can be set to both elevate and convey the freight, so that no handling is required between the vessel and dock, all as hereinafter described and claimed.

Reference is to be had to the accompanying drawings, forming part of this specification, in which similar letters of reference indicate corresponding parts in all the figures.

Figure 1 is a side elevation of the apparatus shown as applied to use in connection with a vessel. Fig. 2 is a front view, showing a portion of the frame and endless chain. Fig. 3 is a cross-section of the base of the frame. Fig. 4 is a side view of the lower chain-wheel. Fig. 5 is a side view of one joint of the frame, and Fig. 6 is a cross-sectional view of the joint. Fig. 7 is a transverse section of the frame and lower chain-wheel, and Figs. 8 and 9 are detail views of the endless chain and tables.

Referring to Fig. 1, A is a vessel, and B the dock, to which the elevator and conveyer is applied for receiving the freight from either hold of the vessel and delivering it upon the dock.

The apparatus is composed of sections C, preferably four in number, jointed together to turn at any suitable angle, one upon another, and carrying endless chains $a\,a$, that run over chain or sprocket wheels $b\,b$ at the upper and lower ends of the apparatus. Each section C, as shown most clearly in Figs. 2, 5, 6, and 7, is composed of rails $c\,c$, fitted at their ends with joint-plates $d\,d$, that are united to similar plates on the next section by a cross-rod, $e$, on which the section turns. The plates $d$ are apertured, as shown in Fig. 5, and a cross-bolt, $f$, passing through the apertures from one side to the other, retains the sections at the angle desired. The chains $a$ are united by cross-rods $g$, that extend through eyes $g'$, formed on the alternate links of the chain. The chain is composed of alternate short and long links, the eyes $g'$ being upon the shorter links, and the sprocket-wheels, as shown in Fig. 4, have pins at a proper distance apart to enter the longer links, so that there can be no slip.

On the ends of rods $g$ are friction-rollers $h$, that are held between flanges or ribs $i$ on the rails $c$, so that the chains are held in place, and at the ends of sections C the rollers move over the edges of the inner joint-plates $d$ while passing the joint. Guides $k'$ are placed on the ends of the elevator to support the rollers and chain in passing from one side to the other.

The freight carriers or tables consist, as shown most clearly in Figs. 8 and 9, of V-form bars $m$, hung to the cross-rods $g$ of the chains at suitable distances apart, and held in place by braces $n$, that extend from the adjacent rods $g$ to the middle of bars $m$. The braces are forked to stride the bars $m$, and connect with a cross-rod, $o$.

On one side of each section C is a fixed leg, $p$, for sustaining the apparatus, and the legs are provided with rollers or wheels to relieve friction of contact with the vessel or dock. At each joint, as shown in Fig. 6, there are eyes $q$, fitted on the hinge-bolt $f$, for connection of tackle to sustain and move the apparatus. The upper sprocket-wheels, $b$, are on a shaft on which is a pinion, $r$, engaged by a worm on a cross-shaft, $s$, to which power is to be applied, preferably from an engine mounted on the section, to turn the shaft and thus put the chains in motion. The lower sprocket-wheels are adjustable to tighten the chain.

The bottom of the elevator is inclosed by a casing, $t$, which serves to give support by resting on the bottom of the vessel.

The elevator of this construction can be lowered into a vessel and the upper sections then lowered until the leg on the outer end rests on the dock, as shown, and thus form a continuous elevator and conveyer. In operation the barrels, bales, and other packages are placed over the casing $t$, and are caught up by the tables $m$ as they rise. They are then carried up and to the outer end of the apparatus, from whence they are discharged.

Having thus fully described my invention, I claim as new and desire to secure by Letters Patent—

1. In freight-elevators, the combination, with the endless chain $a$, provided with tables $m$, and the sprocket-wheels $b$, of the sections $c$, provided with the apertured plates $d$, hinged together, and cross-bolt $f$, substantially as shown and described, whereby the said sections are held at any desired angle, as set forth.

2. In freight-elevators, the jointed sections composed of rails $c$, united by joint-plates $d$ and rods $e$, and the endless chains $a$, carrying tables $m$, substantially as shown, described, and combined, for operation as set forth.

3. The endless chains $a$ $a$, provided with eyes $g'$, and connected by rods $g$, and the V-shape bars $m$, held by braces $n$, in combination with the jointed sections C, forming a supporting-frame, substantially as shown and described.

THOMAS KEITH.

Witnesses:
GEO. D. WALKER,
C. SEDGWICK.